(12) United States Patent
Kraemer

(10) Patent No.: US 8,631,085 B2
(45) Date of Patent: Jan. 14, 2014

(54) METHOD FOR EXCHANGING DATA

(75) Inventor: Ralf Kraemer, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 600 days.

(21) Appl. No.: 12/876,486

(22) Filed: Sep. 7, 2010

(65) Prior Publication Data

US 2011/0072102 A1  Mar. 24, 2011

(30) Foreign Application Priority Data

Sep. 24, 2009 (DE) .................... 10 2009 044 936

(51) Int. Cl.
*G06F 15/16* (2006.01)

(52) U.S. Cl.
USPC .......................................... 709/208; 709/203

(58) Field of Classification Search
USPC ................................................ 709/208, 203
See application file for complete search history.

(56) References Cited

U.S. PATENT DOCUMENTS

| 5,579,299 | A | * | 11/1996 | Halter et al. | 370/212 |
| 5,630,152 | A | * | 5/1997 | DeLuca et al. | 712/31 |
| 5,740,189 | A | * | 4/1998 | Tiedje | 714/807 |
| 7,308,516 | B2 | * | 12/2007 | Dressen et al. | 710/110 |
| 8,428,034 | B2 | * | 4/2013 | Mandin | 370/335 |
| 8,437,317 | B2 | * | 5/2013 | Jang et al. | 370/336 |
| 2005/0216621 | A1 | * | 9/2005 | Aichriedler | 710/62 |
| 2005/0239503 | A1 | * | 10/2005 | Dressen et al. | 455/557 |

* cited by examiner

*Primary Examiner* — Waseem Ashraf
(74) *Attorney, Agent, or Firm* — Kenyon & Kenyon LLP

(57) ABSTRACT

A method for exchanging data between a first and at least one second user of a network, the data being exchanged via frames in which during execution of a request by the first user to the at least one second user for a number of k payload data, a read instruction for an nth payload datum is transmitted in at least one nth frame to the at least one second user, and in which all available bits of an immediately subsequent (n+1)th frame are used for directly transmitting the nth payload datum in a response of the at least one second user to the first user.

6 Claims, 5 Drawing Sheets

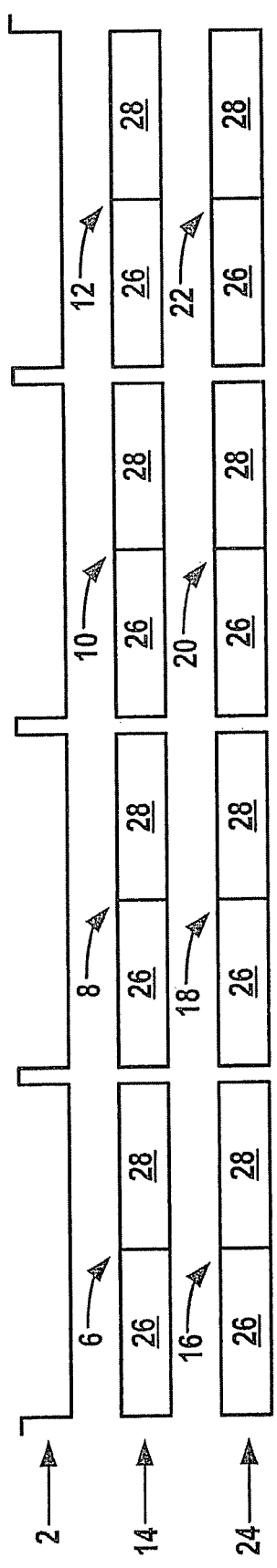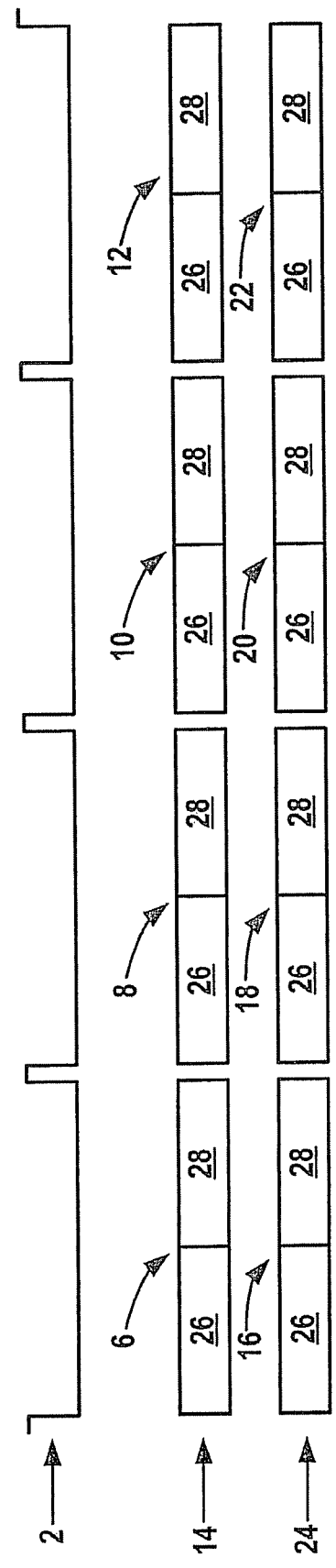

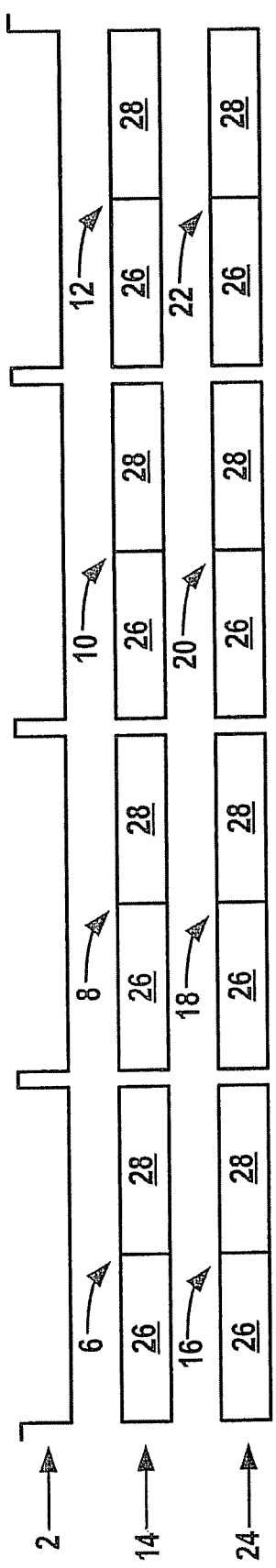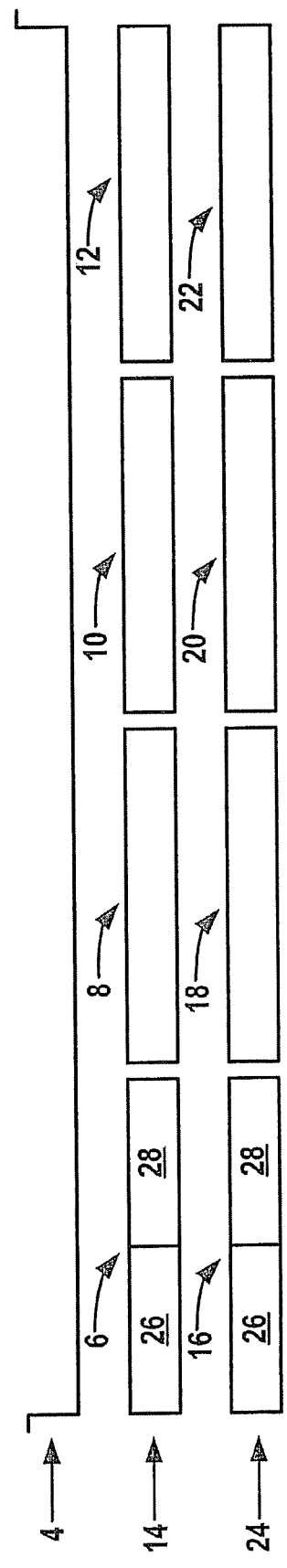

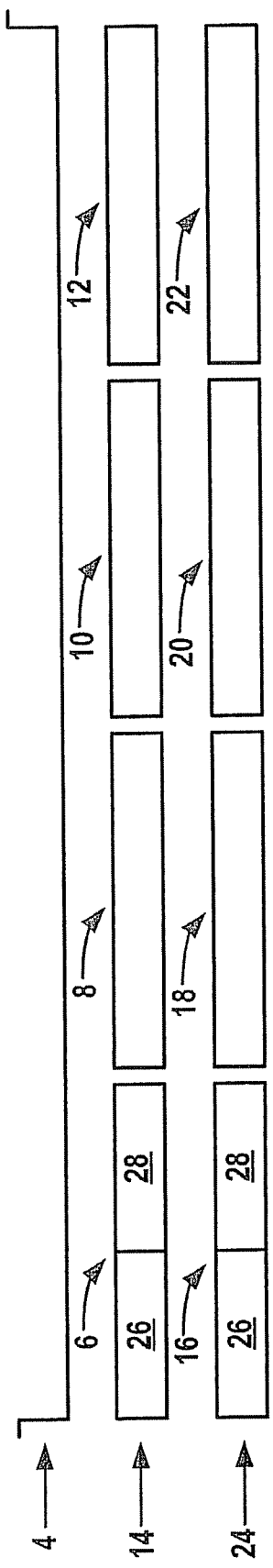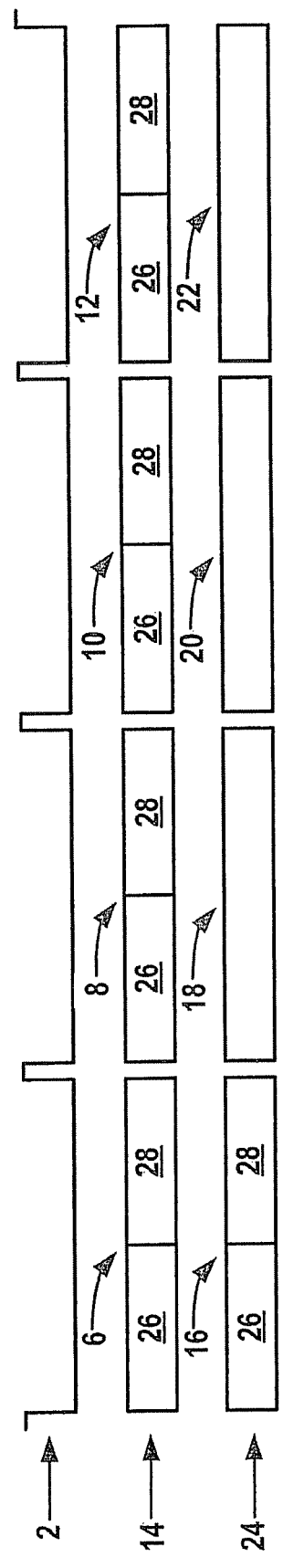

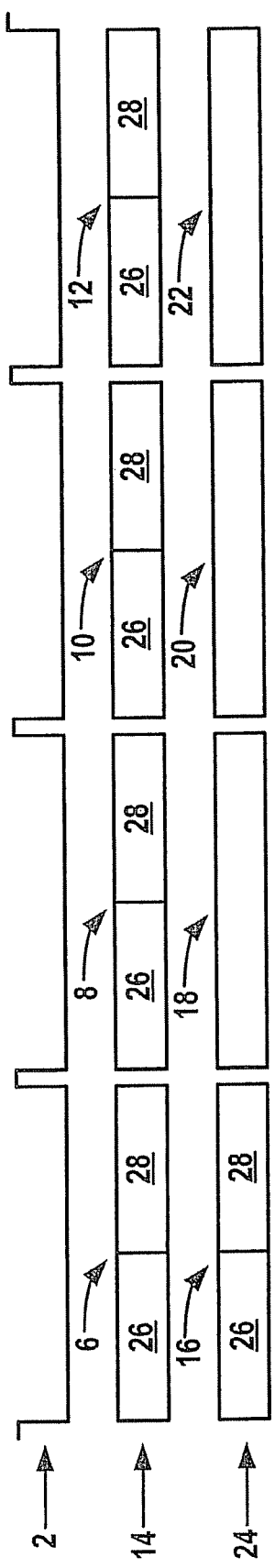
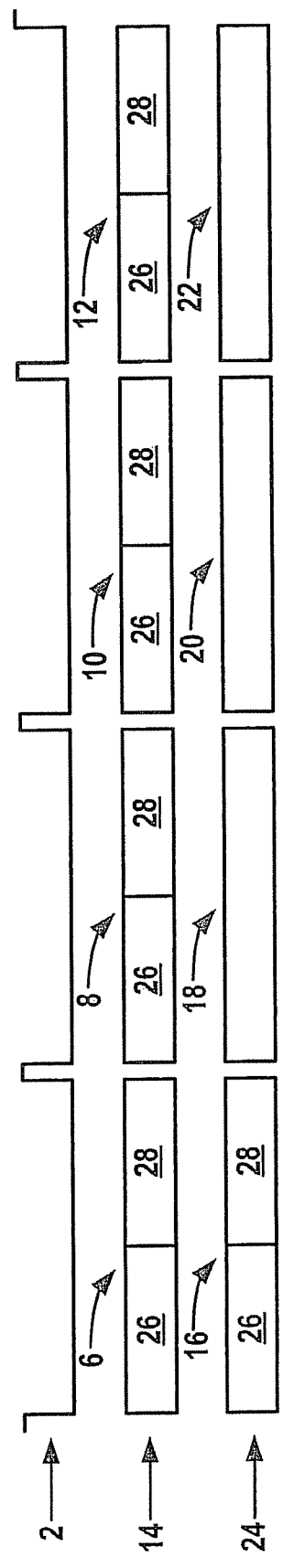

METHOD FOR EXCHANGING DATA

CROSS REFERENCE

The present application claims the benefit under 35 U.S.C. §119 of German Patent Application No. 102009044936.1 filed on Sep. 24, 2009, which is expressly incorporated herein by reference in its entirety.

FIELD OF THE INVENTION

The present invention relates to a method and a system for exchanging data.

BACKGROUND INFORMATION

Within a network or a bus system, which includes different users connected to each other, suitable formats are selected for transmitting data. The data may be transmitted in frames or data packets, each frame including a defined amount of data. Certain networks may have a hierarchic order of users. It is thus possible that a selected user is configured as master to which the other users configured as slaves are subordinated and/or assigned.

During a conventional data transmission between a master and a slave, a so-called burst SPI, or a bundled serial peripheral interface, is used, which allows data, which are stored in frames, to be transmitted by bundles.

SUMMARY

In one example embodiment of the present invention, a so-called burst read or read burst, which enables reading of frames containing any amount and sequence of data by bundles, replaces a burst SPI having a fixed amount and sequence of data. This may result, among other things, in the extension of the address space when data are transmitted between two users which are configured, for example, as devices. The burst read usually includes 16-bit individual frames.

By using a burst read instead of a burst SPI, data in any sequence and amount may be exchanged. The data include both instructions and payload data, from which information for further uses may be extracted.

In general, in a 16-bit SPI, a check byte and a data byte are transmitted on the MISO back channel. During a transmission of 16 bits of data, two instructions or instructions and two 16-bit frames are needed.

In one embodiment of the present invention, an instruction (burst read) and a read instruction as a request for a desired datum, usually a payload datum, are transmitted in the high byte, i.e., the first byte, of a frame during a MOSI transmission, which is not otherwise used in the read operation. In the chronologically subsequent 16-bit frame of the MISO transmission, the entire requested payload datum is transmitted directly, i.e., using a single frame.

Among other things, the data rate may be increased in a read access to the slave and the address space may be extended for the read access to the slave using the present invention.

Furthermore, a burst SPI, which cannot be processed with every microcontroller (μc), is replaced. In addition, a more flexible burst read, i.e., reading of frames by bundles, may be provided.

In one embodiment of the present invention, all 16 bits of the frame are used for implementing the MOSI (master-out-slave-in) function, which provides for output of data from the master and their input in the slave and thus, among other things, a read access to the slave by the master, and an address space is thus extended for the read access. When the MOSI function is implemented, i.e., during a MOSI transmission, the master may request a certain datum in one frame using a read instruction. The datum, for example, a payload datum, is transmitted in the following frame via the MISO (master-in-slave-out) function, using which data are transmitted from the slave to the master, using 16 bits. In burst read, typically no check byte is transmitted. When the burst read is completed, a check byte containing cumulative or appended error flags for the previous transmission may be received in a next or subsequent frame.

The example method may be performed using a standard 16-bit SPI (16-bit serial peripheral interface), data being transmitted from the master to the slave via the MOSI (master-out-slave-in) function. Similarly, data are transmitted from the slave to the master via the MISO (master-in-slave-out) function. In a read access by the master to the slave, the address to be read is transmitted to the reading address in the high byte, which is the byte of the eight most significant bits, of the MOSI function. The low byte or second byte, which includes the eight least significant bits of the frame, is irrelevant here. First a check byte having 8 bits and then the datum also having 8 bits are transmitted via the MISO function. The check byte usually refers to the previous frame. The data byte may refer to the current or previous frame, which depends on a variant of the serial peripheral interface (SPI) that is used. In another variant of the serial peripheral interface, any desired amount of data is output in 16-bit frames in any desired sequence, using burst read for providing data transmission by bundles.

The present invention may be used in systems having one master and at least one slave and is, among other things, also suitable for use in a system for a motor vehicle, for example, for evaluating payload data of a lambda sensor.

The above-described system is designed for performing all steps of the above-presented method. Individual steps of this method may also be performed by individual components of the system. Furthermore, functions of the system or functions of individual components of the system may be implemented as steps of the method. In addition, it is possible to implement steps of the method as functions of individual components of the system or of the entire system.

BRIEF DESCRIPTION OF THE DRAWINGS

Further advantages and embodiments of the present invention result from the description and the figures.

It is understood that the above-named features described below are usable not only in the given combination, but also in other combinations or by themselves without leaving the scope of the present invention.

FIG. 1 schematically shows a diagram of a first example of a data transmission between a master and a slave.

FIG. 2 schematically shows a diagram of a second example of a data transmission between a master and a slave.

FIG. 3 schematically shows a diagram of a third example of a data transmission between a master and a slave.

FIG. 4 schematically shows a diagram of a fourth example of a data transmission between a master and a slave.

FIG. 5 schematically shows a diagram of a fifth example of a data transmission between a master and a slave.

FIG. 6 schematically shows a diagram of a data exchange between a master and a slave in a first specific embodiment of the example method according to the present invention.

FIG. 7 schematically shows a diagram of a data exchange between a master and a slave in a second specific example embodiment of the method according to the present invention.

FIG. 8 schematically shows a diagram of a data exchange between a master and a slave in a third specific example embodiment of the method according to the present invention.

DETAILED DESCRIPTION OF EXAMPLE EMBODIMENTS

Figure 9:
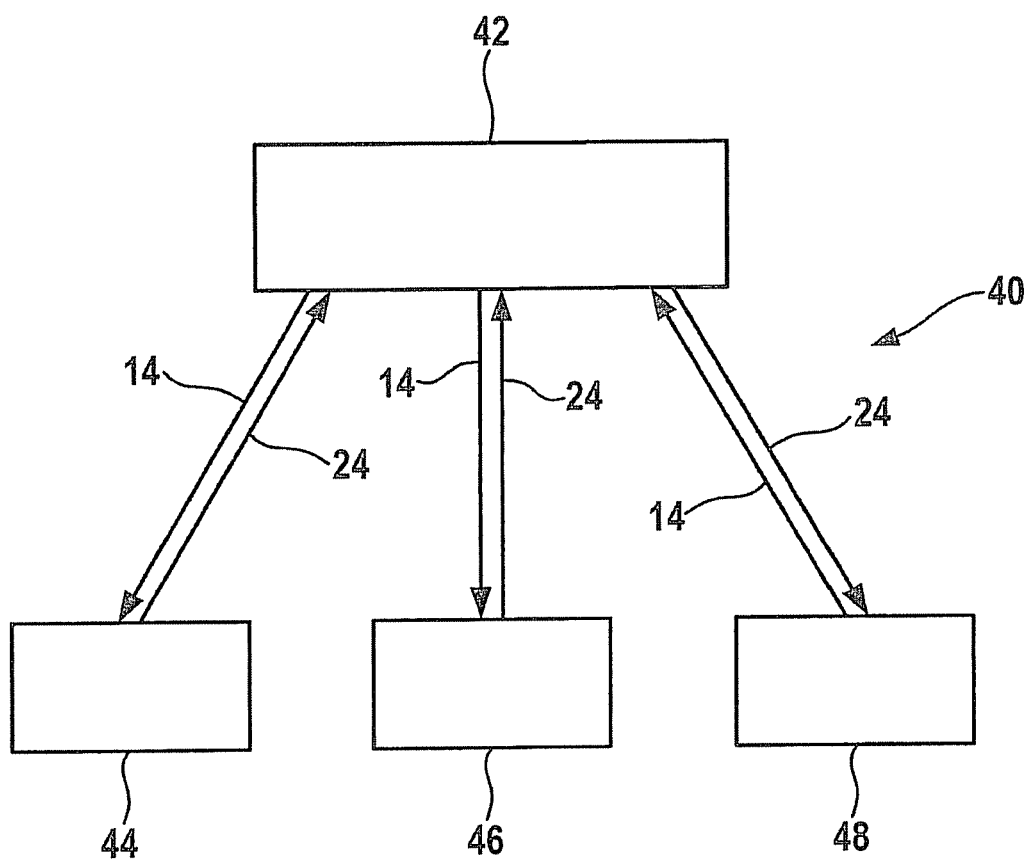
FIG. 9 schematically shows a specific example embodiment of a system according to the present invention.

The present invention is schematically illustrated in the figures on the basis of specific example embodiments and described in greater detail below.

The figures are described consistently and comprehensively; the same reference numerals refer to the same components.

The diagrams of all FIGS. 1 through 8 have three lines. The first line of each diagram is provided for chip selection. The diagrams of FIGS. 1, 2, 3, 6, 7, and 8 show a first chip selection 2 for individual frames. In contrast, the diagrams of FIGS. 4 and 5 show a second chip selection 4 for a plurality of frames in a burst SPI for reading frames containing data by bundles.

The second line of each diagram shows a first frame 6, a second frame 8, a third frame 10, and a fourth frame 12, which are transmitted from the master to the slave. A MOSI, i.e., master-out-slave-in transmission 14 thus takes place for these frames 6, 8, 10, 12 for implementing a MOSI function. The third line of the diagrams of all FIGS. 1 through 8 schematically shows a first frame 16, a second frame 18, a third frame 20, and a fourth frame 22, which are transmitted from the slave to the master. In all the illustrated examples and specific embodiments, a MISO, i.e., master-in-slave-out transmission 24 takes place for these transmitted frames 16, 18, 20, 22 for implementing a MISO function.

In all examples of FIGS. 1 through 5 and in all specific embodiments of the present invention, in the diagrams of FIGS. 6, 7, and 8, all illustrated frames 6, 8, 10, 12, 16, 18, 20, 22 have a length of 16 bits. Some of the illustrated frames 6, 8, 10, 12, 16, 18, 20, 22 are subdivided into a high byte 26, i.e., a most significant or first byte, which has 8 bits, and a low byte 28, i.e., a least significant or second byte, which also has 8 bits. None of the other frames illustrated in the figures is subdivided into high bytes 26 and low bytes 28.

FIG. 1 shows a first example of a conventional data transmission. Within a frame 6, 8, 10, 12, 16, 18, 20, 22, 16-bit data are transmitted, a response within a MISO transmission 24 being transmitted by the master during MOSI transmission 14 in the same frame 16, 18, 20, 22 synchronously with frame 6, 8, 10, 12, respectively. During MOSI transmission 14, high byte 26 of first frame 6 has a read instruction. Low byte 28 of first frame 6 is occupied by any type of data. In second frame 8, high byte 26 is occupied by a write instruction and low byte 28 is occupied by a payload datum. Third frame 10 is occupied by data as is first frame 6, and fourth frame 12 is occupied by data as is second frame 8.

During MISO transmission 24, high bytes 26 of all frames 16, 18, 20, 22 have a check byte. Payload data are provided for low byte 28 of first frame 16 and of third frame 20. Low bytes 28 of the second and fourth frames each have any type of data.

The diagram of FIG. 2 also shows an example of conventional data transmission, where a request takes place with frames 6, 8, 10, 12 of MOSI transmission 14. A response is transmitted within MISO transmission 24 in the subsequent frame 16, 18, 20, 22, respectively. In detail, an nth read instruction (read n) is provided in high byte 26 of first frame 6 for requesting an nth payload datum. In low byte 28 of first frame 6, any type of data is transmitted. High byte 26 of second frame 8 has an (n+1)th read instruction (read n+1). Low byte 28 is again occupied by any type of data. High byte 26 of third frame 10 includes a write instruction. Low byte 28 of third frame 10 has a payload datum. For fourth frame 12, it is provided that both high byte 26 and low byte 28 are empty.

During MISO transmission 24, an (n−1)th check byte is transmitted in high byte 26 of first frame 16 and (n−1)th payload datum 28 is transmitted in low byte 28. An nth check byte is transmitted in high byte 26 of second frame 18 and an nth payload datum is transmitted in low byte 28, whereby the nth read instruction from high byte 26 of first frame 6 is responded to during MOSI transmission 14. With third frame 20, an (n+1)th check byte is transmitted in high byte 26 and an (n+1)th payload datum is transmitted in low byte 28. For high byte 26 of fourth frame 22, transmission of an (n+2)th check byte is provided. Low byte 28 of fourth frame 22 is occupied by any type of data.

The diagram of FIG. 3 describes the third example of a data transmission between a master and a slave. In this third example, a response is given to a request by the master, which during MOSI transmission 14 occurs in an nth frame 6, 8, 10, 12, and during MISO transmission 24 in the subsequent frame 16, 18, 20, 22, respectively. In addition, output of a 16-bit datum is also provided in this case.

During MOSI transmission 14, a read instruction for a high byte of an nth datum (read n-high) is provided in high byte 26 of first frame 6. Low byte 28 of fourth frame 6 is occupied by any type of data. A read instruction (read n-low) for a low byte of an nth payload datum follows in high byte 26 of second frame 8. Low byte 28 of second frame 8 is occupied by any type of data. A write instruction is transmitted in high byte 26 of third frame 10. In low byte 28 of third frame 10 a payload datum is transmitted. No data are transmitted in fourth frame 12.

During MISO transmission 24, an (n−1)th check byte is transmitted with high byte 26 of first frame 16 and an (n−1)th payload datum is transmitted with low byte 28. An nth check byte is transmitted in high byte 26 of second frame 18 and a high byte of a payload datum ("data n-high") is transmitted in low byte 28 in response to the first frame of MOSI transmission 14. An (n+1)th check byte is transmitted in high byte 26 of third frame 20 and a low byte of an nth payload datum ("data n-low") is transmitted in low byte 28. An (n+2)th check byte is transmitted in high byte 26 of fourth frame 22 and any type of data is transmitted in low byte 28.

In the fourth example of data transmission between a master and a slave illustrated in the diagram of FIG. 4, an n*16-bit burst SPI is provided for transmitting n payload data in frames 6, 8, 10, 12, 16, 18, 20, 22 by bundles or in blocks.

During MOSI transmission 14, a so-called burst SPI takes place in high byte 26 of first frame 6 and thus a read instruction is transmitted for reading data by bundles or in blocks. Low byte 28 of first frame 6 and of additional frames 8, 10, 12, is occupied by any type of data in this case.

During MISO transmission 24, a check byte is transmitted in high byte 26 of first frame 16 and any type of data is transmitted in low byte 28. Furthermore, an nth payload datum (data n) is transmitted in second frame 18, an (n+1)th payload datum (data n+1) is transmitted in third frame 20, and an (n+x)th payload datum (data n+x) is transmitted in fourth frame 22.

A fifth example and thus a special case of the example shown with reference to FIG. 4 for executing an n*16-bit burst SPI is schematically illustrated in the diagram of FIG. 5 for transmitting three payload data in the case of a 3*16-bit burst SPI. During MOSI transmission 14, a burst SPI is transmitted in high byte 26 of first frame 6 similarly to the fourth example of FIG. 4. Any type of data is transmitted in low byte 28 of first frame 6 and in the three subsequent frames 8, 10, 12.

During MISO transmission 24, a check instruction is transmitted in high byte 26 of first frame 16 and any type of data is transmitted in low byte 28. A payload datum A (data A) is transmitted in second frame 18, a payload datum B (data B) is transmitted in third frame 20, and a payload datum C (data C) is transmitted in fourth frame 22.

Consequently, conventionally, all payload data are requested, using a single instruction, for executing the burst SPI and then transmitted in a bundle. The burst SPI is a command or instruction, which triggers a burst for transmission of payload data by bundles, for example, on the MISO back channel. The instructing MOSI channel is needed only for transmitting the burst SPI read instruction.

The diagram of FIG. 6 shows a first specific embodiment of a method according to the present invention for exchanging data between a master and a slave using burst read for transmitting individual frames, a first chip select 2 occurring for individual frames.

When data are output by the master and received by the slave according to MOSI transmission 14, an nth read instruction (read n) is transmitted to high byte 26 of first frame 6 for requesting an nth payload datum, and an address is transmitted in low byte 28 of first frame 6. An (n+1)th read instruction (read n+1) is transmitted in high byte 26 of second frame 28 for requesting an (n+1)th frame and an address is transmitted in low byte 28 of second frame 8. An (n+x)th read instruction (read n+x) is transmitted in high byte 26 of third frame 10 for requesting an (n+x)th payload datum. An address is transmitted in low byte 28 of third frame 10. Either a read instruction or a write instruction may be transmitted in high byte 26 of fourth frame 12. Either any type of data or a payload datum may be transmitted in low byte 28 of fourth frame.

During the MISO transmission, transmission of an (n−1)th check byte (check n−1) is provided for high byte 26 of first frame 16. An (n−1)th payload datum (data n−1) is transmitted in low byte 28 of first frame 16. An nth payload datum (data n) is transmitted in the subsequent second frame 18, an (n+1)th payload datum (data n+1) is transmitted in third frame 20, and an (n+x)th payload datum (data n+x) is transmitted in fourth frame 22.

In the first specific embodiment of the method according to the present invention, which is explained with the aid of FIG. 6, during MISO transmission 24, the nth payload datum in second frame 18 follows first frame 6 of the MOSI transmission, in whose high byte 26 the nth read instruction is transmitted for requesting the nth payload datum. (n+1)th read instruction from high byte 26 of second frame 8 is responded to by the transmission of the (n+1)th payload datum in the immediately following third frame 20 of MISO transmission 24. The (n+x)th read instruction from high byte 26 of third frame 10 during MOSI transmission 14 is responded to in the immediately following fourth frame 22 of MISO transmission 24 via the transmission of the (n+x)th payload datum.

The diagram of FIG. 7 schematically shows a second specific embodiment of the method according to the present invention for exchanging data between a master and a slave, a first chip select 2 occurring for the transmission of individual 16-bit long frames. During MOSI transmission 14 for outputting data by the master and receiving data by the slave, a transmission of a read instruction A (read A) for requesting a payload datum A is provided in high byte 26 of first frame 6, and the transmission of an address is provided in low byte 28. A read instruction B (read B) for requesting a payload datum B is transmitted in high byte 26 of second frame 8 and an address is transmitted in low byte 28. A read instruction C (read C) is transmitted in high byte 26 of third frame 10 for requesting a payload datum C, and an address is transmitted in low byte 28. A read instruction or a write instruction may be transmitted in high byte 26 of third frame 10. Either any type of data or a payload datum may be transmitted in low byte 28 of fourth frame 12.

During MISO transmission 24, an (n−1)th check byte (check n−1) is transmitted in first frame 16, and an (n−1)th payload datum (data n−1) is transmitted in low byte 28. The payload datum A (data A) is transmitted in second frame 18, as requested during MOSI transmission 14, the payload datum B (data B) is transmitted in third frame 20, and the payload datum C (data C) is transmitted in fourth frame 22.

Similarly to the procedure as explained for the specific embodiment of the method according to the present invention described using FIG. 6, a payload datum requested by the master during MOSI transmission 14 is transmitted by the slave during MISO transmission 24 in an immediately subsequent frame. In the present specific embodiment this means that second frame 18 for transmitting the payload datum A immediately follows read instruction A from high byte 26 of first frame 6. In third frame 20, the payload datum B immediately follows read instruction B from high byte 26 in second frame 8. Similarly, the payload datum C requested by read instruction C in high byte 26 of third frame 10 during MOSI transmission 14 is transmitted in the immediately subsequent fourth frame 22 when executing MISO transmission 24.

The third exemplary embodiment of the method according to the present invention is schematically illustrated in FIG. 8. As in the two other exemplary embodiments of the method according to the present invention, in this case a first chip select 2 is also provided for transmitting individual frames.

During MOSI transmission 14 for outputting data by the master and receiving data by the slave, a transmission of a read instruction B (read B) is provided in high byte 26 of first frame 6, and the transmission of an address is provided in low byte 28. A read instruction A (read A) is transmitted in high byte 26 of frame 8 and an address is transmitted in low byte 28. A read instruction C (read C) is transmitted in high byte 26 of third frame 10, and an address is transmitted in low byte 28. A read instruction or a write instruction may be transmitted in high byte 26 of fourth frame 10. Either any type of data or a payload datum may be transmitted in low byte 28 of fourth frame 12.

During MISO transmission 24, an (n−1)th check byte (check n−1) is transmitted in first frame 16, and an (n−1)th payload datum (data n−1) is transmitted in low byte 28. The payload datum B (data B) is transmitted in second frame 18, the payload datum A (data A) is transmitted in third frame 20, and the payload datum C (data C) is transmitted in fourth frame 22. Unlike in the specific embodiment which is described using FIG. 7, the time sequence of a transmission of read instructions B and A during MOSI transmission 14 is reversed for requesting payload data B and A. In a similar sequence, the requested payload data B and A are transmitted during MISO transmission 24 from the slave to the master.

In the above-described specific embodiments of the present invention, this payload data is individually requested via an appropriate write instruction, which is associated with a certain payload datum or directed thereto. It is thus possible, among other things, to select certain payload data, which are then also transmitted.

In all specific embodiments of the method according to the present invention, burst read is used on the instructing MOSI channel during MOSI transmission 14 in high bytes 26 of frames 6, 8, 10, 12 as a command or instruction. The address of the desired payload datum is transmitted in low bytes 28. The desired payload datum determines the contents of the 16 bits in frames 16, 18, 20, 22 on the MISO back channel.

During transmission of the payload data, the check byte is replaced by a high byte of a particular payload datum in high byte 26 of each frame 16, 18, 20, 22. A particular low byte 28 of the payload datum is transmitted from the slave to the master in the low byte of a particular frame 16, 18, 20, 22. While an nth payload datum is transmitted over the MISO back channel, next, an (n+1)th payload datum is requested via the instructing MOSI channel. In this case both MOSI and MISO channels are then used for data transmission.

FIG. 9 schematically shows one specific embodiment of a system 40 according to the present invention which includes a network having a device or user designed as master 42, and three devices or users designed as slaves 44, 46, 48. Data are exchanged, among other things, between master 42 and slaves 44, 46, 48 via MOSI transmissions 14 and MISO transmissions 24, as described with reference to FIGS. 6, 7, and 8.

What is claimed is:

1. A method for exchanging data between a first and at least one second user of a network, the data being exchanged via multiple frames in a burst mode of an SPI communication between the first user as a master and the second user as a slave, the method comprising:

transmitting, as part of a command frame from the master, a burst read instruction for an nth payload datum and a corresponding address during execution of a request by the first user to the at least one second user for a number of k payload data, the burst read instruction and the corresponding address being transmitted in at least one nth frame to the at least one second user; and receiving, by the first user, an immediately subsequent (n+1)th frame from the second user, all available bits of the (n+1)th frame being used for directly transmitting, as part of a response frame from the slave, the nth payload datum in a response of the at least one second user to the first user;

wherein (i) multiple command frames and multiple response frames are transmitted during the burst mode starting with the command frame in the nth frame, (ii) each command frame from the master contains a burst read instruction and a corresponding address, and (iii) each response frame from the slave only contains a payload datum and no check information.

2. The method as recited in claim 1, wherein the k payload data are requested in any desired sequence, and the k payload data are transmitted in the same sequence.

3. The method as recited in claim 1, wherein the frames which have a data capacity of 16 bits.

4. The method as recited in claim 1, wherein a check byte for an (n−1)th payload datum and the (n−1)th payload datum is received by the first user from the second user in a frame, wherein the data transmission for the (n−1)th payload datum is transmitted during transmission of the frame containing the request for the nth payload datum by the first user to the second user.

5. The method as recited in claim 1, wherein the request by the first user to the second user is transmitted and the k payload data are transmitted by the slave to the master is via a master-in-slave-out transmission.

6. A system for exchanging data between a first user and at least one second user of a network, in which data are exchanged using multiple frames in a burst mode of an SPI communication between the first user as a master and the second user as a slave, comprising:

a first user having a hardware processor configured to transmit, as part of a command frame from the master, a burst read instruction and a corresponding address to the at least one second user in at least one nth frame during execution of a request for a number of k payload data to the at least one second user, wherein the at least one second user includes a hardware processor and is configured to use all available bits of an immediately subsequent (n+1)th frame, as part of a response frame from the slave, for directly transmitting the nth payload datum in providing a response to the first user;

wherein (i) multiple command frames and multiple response frames are transmitted during the burst mode starting with the command frame in the nth frame, (ii) each command frame from the master contains a burst read instruction and a corresponding address, and (iii) each response frame from the slave only contains a payload datum and no check information.

\* \* \* \* \*